(12) United States Patent
Yamasaki et al.

(10) Patent No.: US 7,806,566 B2
(45) Date of Patent: Oct. 5, 2010

(54) LIGHT SOURCE UNIT AND PROJECTION TYPE VIDEO DISPLAY APPARATUS USING THE SAME

(75) Inventors: Futoshi Yamasaki, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1192 days.

(21) Appl. No.: 11/035,709

(22) Filed: Jan. 13, 2005

(65) Prior Publication Data
US 2005/0190307 A1 Sep. 1, 2005

(30) Foreign Application Priority Data
Jan. 16, 2004 (JP) .............................. 2004-008620

(51) Int. Cl.
*F21V 7/00* (2006.01)
(52) U.S. Cl. ......................................... 362/298; 353/98
(58) Field of Classification Search .................... 353/98; 362/296, 310, 241, 249.02, 296.01, 296.07, 362/296.08, 346, 350
See application file for complete search history.

(56) References Cited

U.S. PATENT DOCUMENTS

| | | | |
|---|---|---|---|
| 7,008,079 B2 * | 3/2006 | Smith | 362/235 |
| 7,072,096 B2 * | 7/2006 | Holman et al. | 359/298 |
| 7,112,916 B2 * | 9/2006 | Goh et al. | 313/113 |
| 7,369,316 B2 * | 5/2008 | Shanley et al. | 359/629 |
| 7,377,679 B2 * | 5/2008 | Schultz et al. | 362/609 |
| 7,407,313 B2 * | 8/2008 | Schardt et al. | 362/609 |
| 2002/0024808 A1 * | 2/2002 | Suehiro et al. | 362/245 |
| 2002/0149942 A1 * | 10/2002 | Suehiro | 362/298 |
| 2003/0202349 A1 * | 10/2003 | Suehiro et al. | 362/245 |
| 2003/0231497 A1 * | 12/2003 | Sakata et al. | 362/341 |
| 2004/0114778 A1 * | 6/2004 | Gobeli et al. | 381/356 |
| 2006/0181872 A1 * | 8/2006 | Pashley | 362/231 |

FOREIGN PATENT DOCUMENTS

| | | |
|---|---|---|
| JP | 09-106705 A | 4/1997 |
| JP | 11-266035 A | 9/1999 |
| JP | 2000-121997 A | 4/2000 |
| JP | 2002-151746 | 5/2002 |
| JP | 2002-374004 A | 12/2002 |
| JP | 2003-329978 | 11/2003 |

* cited by examiner

*Primary Examiner*—Seung C Sohn
*Assistant Examiner*—Bao-Luan Le
(74) *Attorney, Agent, or Firm*—Townsend and Townsend and Crew LLP

(57) ABSTRACT

In a projection type video display apparatus, in order to assure sufficient brightness by suppressing a decrease in light utilization efficiency inside a limited output aperture area of a light source unit, a transmission or reflection type liquid crystal is used for a video display device and the light source unit having a plurality of reflectors or focusing mirrors in correspondence with LED's representing light sources is so constructed as to satisfy $D<4\times f$ or $D<4\times Z$, where D represents an effective diameter of a reflector, f represents a focal distance of a mirror and Z represents a distance between a light emitter of the light source and an apex at a center of the mirror.

4 Claims, 3 Drawing Sheets

APERTURE EFFICIENCY IN RELATION TO REFLECTOR RADIUS IN SINGLE LED

APERTURE EFFICIENCY IN RELATION TO REFLECTOR AREA

TOTAL LUMINOUS FLUX QUANTITY AND OUTPUT EFFICIENCY IN RELATION TO REFLECTOR RADIUS IN LIGHT SOURCE UNIT

LIGHT SOURCE UNIT AND PROJECTION TYPE VIDEO DISPLAY APPARATUS USING THE SAME

INCORPORATION BY REFERENCE

The present application claims priority from Japanese application JP 2004-008620 filed on Jan. 16, 2004, the content of which is hereby incorporated by reference into this application.

BACKGROUND OF THE INVENTION

This invention relates to a light source unit having a plurality of arrayed light sources such as LED's and a projection type video display apparatus in which the intensity of light from the light source unit is modulated by means of a video display device formed of, for example, transmission or reflection type liquid crystal or DMD (small mirror) and an optical image thus formed is projected.

A projection type video display apparatus as represented by a liquid crystal projector has hitherto been known in which light from a light source is caused to impinge upon a video display device such as liquid crystal panel and an image on the liquid crystal panel is projected in enlarged size.

Many products of a projection type video display apparatus using a light source formed of a single lamp or a plurality of lamps each capable of being supplied with high power for the purpose of increasing brightness have hitherto been manufactured but recently, a trend toward the application of a so-called LED light source such as light emitting diode, organic EL or the like has been studied because of its good color purity, long lifetime and good lighting capability. In this case, to supplement a shortage of brightness, many arrayed LED light sources are often used. For example, JP-A-2002-374004 discloses this type of LED light source unit and a projection type video display apparatus using the same.

Recently, as disclosed in, for example, JP-A-2002-151746, a reflection type LED has also been proposed in which light from an LED is reflected by a concave reflection mirror so as to be delivered forwardly. In addition, JP-A-2003-329978, for example, discloses an LED light source unit having reflection type LED's of this type arranged in matrix and a projection type video display apparatus using the same.

SUMMARY OF THE INVENTION

In materializing a projection type video display apparatus using a light source unit having a plurality of arrayed light sources such as LED's, the quantity of output luminous flux per light source is very small as compared to the output luminous flux quantity of, for example, a high-pressure mercury arc lamp used conventionally and as a result, sufficient brightness of a projected image is difficult to obtain. Accordingly, a proposal to form a light source unit by arranging a plurality of light sources has been made publicly. But, in an illumination optics system of the projection type video display apparatus, an incident aperture for taking in luminous flux from the light sources is restricted in size and therefore, even when many light sources can be arrayed, the number of light sources the luminous flux from which can be guided efficiently to the incident aperture is limited. In other words, how to cause light sources arranged in a restricted area to deliver or emit as much luminous flux as possible must be thought highly of.

Under the circumstances, high brightness is aimed at by arraying many LED light sources as disclosed in the afore-mentioned JP-A-2003-329978 or by using reflection type LED's for respective LED light sources as disclosed in the afore-mentioned JP-A-2002-151746 but these literatures in no way consider a configuration for delivering maximal luminous flux from a limited area of light sources.

This invention is made in the light of the problems as described above and it is an object of this invention to provide a light source unit which can realize high brightness while suppressing a decrease in light utilization efficiency inside a predetermined area and a projection type video display apparatus using the same.

To solve the above problems, this invention is constructed as recited in the appended claims. More specifically, this invention perceives that the efficiency of each light source is not maximized but output luminous flux per area of each light source is maximized for the purpose of maximizing output luminous flux per predetermined area.

When the size of a focusing mirror of each light source is delimited as recited in the appended claims, the quantity of luminous flux delivered out of each light source does not have a maximal value but correspondingly, many light sources can be arrayed in a limited area and the quantity of light delivered out of a light source unit can be increased.

According to this invention, a high-brightness display can be assured in the projection type video display apparatus.

Other objects, features and advantages of the invention will become apparent from the following description of the embodiments of the invention taken in conjunction with the accompanying drawings.

DETAILED DESCRIPTION OF THE EMBODIMENTS

Figure 1:
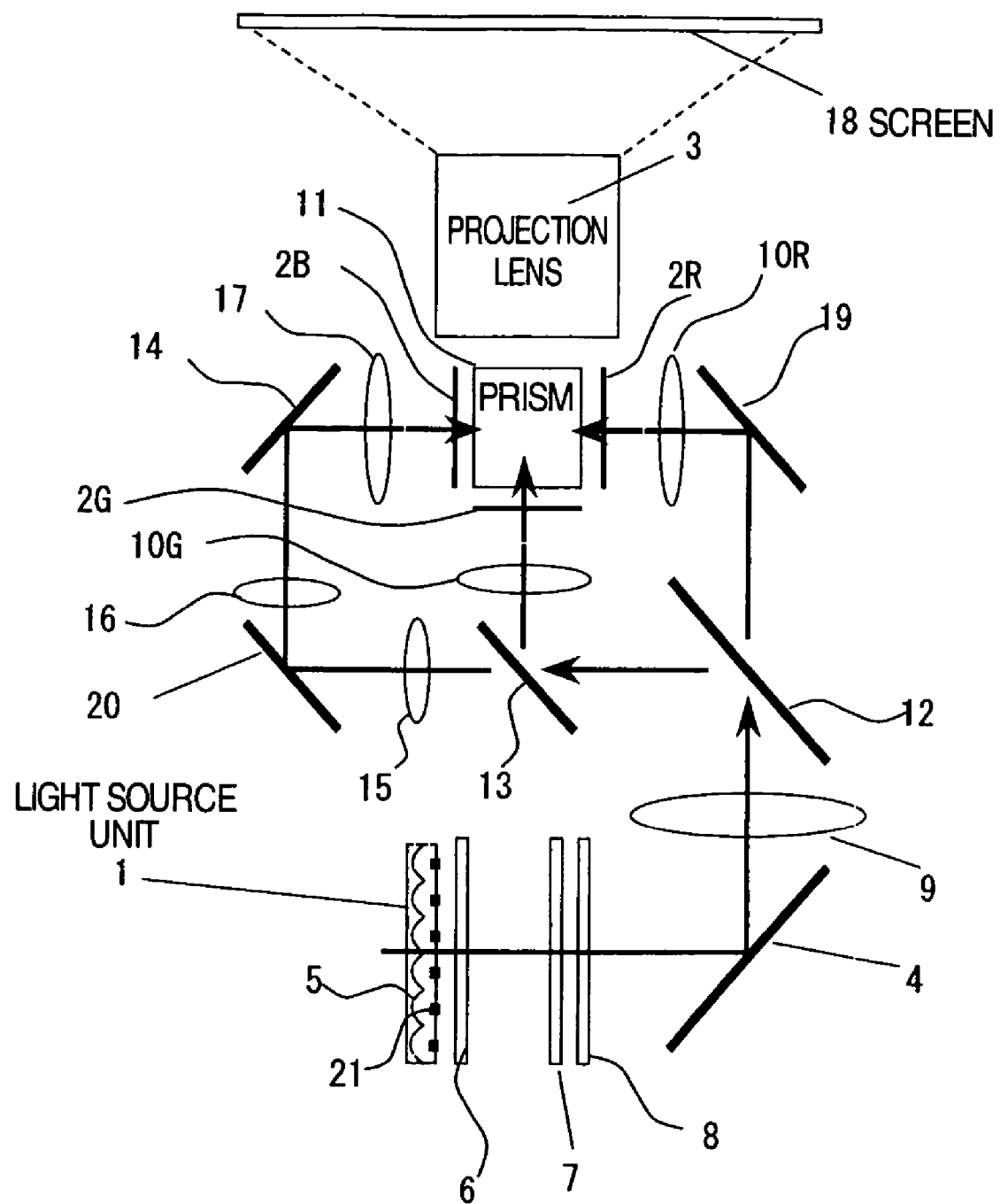
FIG. 1 is a schematic diagram showing a projection type video display apparatus according to one embodiment of this invention.

Embodiments of this invention will now be described with reference to the accompanying drawings. Throughout the drawings, like constituents having the same function are designated by like reference numerals.

The present embodiment will be described by way of example of a transmission type liquid crystal panel being applied to a video display device but obviously, a reflection type liquid crystal panel, a DMD mirror device or the like may be applicable to this invention.

Embodiment 1

A projection type video display apparatus according to one embodiment of this invention is constructed as schematically illustrated in FIG. 1. In the figure, a light source unit 1 according to teachings of this invention has a plurality of arrayed reflection type LED's. Each of the reflection type LED's constituting the light source unit 1 is provided with a reflector 5 which is a reflection mirror taking the form of a paraboloid of revolution to permit luminous flux from light emitters 21 of LED chips to be irradiated highly efficiently on a succeeding optics system. Transmission type liquid crystal panels 2R, 2G, 2B are video display devices corresponding to three primary colors R, G, B, respectively, and are driven by a video signal drive circuit, not shown, to modulate the luminous flux from the light source unit 1 in light intensity in accordance with a video signal, thereby forming an optical image. Also provided are a projection lens 3, a mirror 4, first and second lens arrays 6, 7 constituting a so-called integrator optics system, a polarization transformer 8 for aligning luminous flux from the integrator optics system in a predetermined polarization direction, a focusing lens 9, condenser lenses 10R, 10G, a synthesis prism 11, dichroic mirrors 12, 13 for color separation, a mirror 14, a first relay lens 15, a second relay lens 16, a third relay lens 17, a screen 18, and mirrors 19, 20. As a principal component other than the above, a power supply circuit is provided, though not shown.

In FIG. 1, white luminous flux emitted from the light emitter 21 of LED chip of each reflection type LED light source in the light source unit 1 is reflected by the reflector 5 having the form of a paraboloid of revolution so as to be incident on the first lens array 6 constituting the integrator optics system. The first lens array 6 comprising a plurality of lens cells arranged in matrix divides the incident luminous flux into a plurality of luminous flux partitions and guides them such that they can efficiently pass through the second lens array 7 and polarization transformer 8. In the second lens array 7 comprising a plurality of lens cells arranged in matrix similarly to the first lens array, individual constituent lens cells project shapes of corresponding lens cells of the first lens array 6 upon the transmission type liquid crystal panels 2R, 2G, 2B. In this phase, the polarization transformer 8 aligns the luminous flux partitions from the second lens array in a predetermined polarization direction. Then, the projection images of individual lens cells of the first lens array 6 are superimposed on the individual liquid crystal panels 2R, 2G, 2B by means of the focusing lens 9, condenser lenses 10R, 10G, first relay lens 15, second relay lens 16, and third relay lens 17.

In this process, the white light emitted from the light source 1 is separated into light rays of three primary colors of red (R), green (G) and blue (B) by means of the dichroic mirrors 12, 13 constituting a color separation means and the rays are irradiated on the corresponding liquid crystal panels 2R, 2G, 2B, respectively. It will be appreciated that the dichroic mirror 12 has a red transmission/green and blue reflection characteristic and the dichroic mirror 13 has a green reflection/blue transmission characteristic.

In cooperation with input/output polarization plates, not shown, and the video signal drive circuit also not shown, the individual liquid crystal panels 2R, 2G, 2B control the quantities of light transmitting through them to perform light intensity modulation for changing shades of color in respect of the individual pixels, thereby forming an optical image.

Further, individual optical images brightly irradiated on the liquid crystal panels 2R, 2G, 2B are subjected to color synthesis by means of the synthesis prism 11 and then projected on the screen 18 by means of the projection lens 3 to provide a large screen picture.

The liquid crystal panel 2B has a longer optical path than that of the liquid crystal panels 2R, 2G and this longer path is compensated for by means of the first relay lens 15, second relay lens 16 and third relay lens 17.

The shape of the reflector of the light source unit 1 is characteristic of this invention and will be described in greater detail. To describe details of the reflection type LED forming a unit portion constituting the light source unit 1 in FIG. 1, one reflection type LED in the light source unit is taken out and the optical schematic structure is illustrated in FIG. 2.

Figure 2:
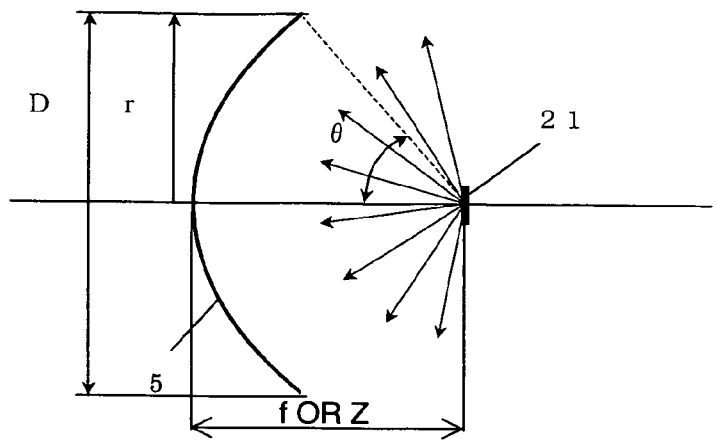
FIG. 2 is a diagram showing details of part of a light source unit.

Referring to FIG. 2, the light emitter 21 of an LED chip of reflection type LED and the reflector 5 having, for example, the shape of a paraboloid of revolution and adapted to reflect light from the light emitter 21 of an LED chip are illustrated exaggeratedly. The reflector 5, also serving as a focusing mirror, has a diameter D and a radius r. The light emitter 21 is illustrated as being sectioned on a plane including an axis (hereinafter referred to as "optical axis") connecting the center of light emitter 21 and an apex of reflector 5. Luminous flux emitted from the light emitter 21 makes an angle θ to the optical axis. The reflector 5 taking the form of a paraboloid of revolution has a focal distance f and generally, the light emitter 21 is disposed at the focal position of reflector 5. Luminous flux is emitted substantially semi-spherically toward the reflector 5 from the light emitter 21 of LED light source pursuant to the well-known Lambert distribution, spreading by 90° in terms of a value of θ in the figure. When the intensity of light on the optical axis is $I_0$, that in the direction making the angle θ is expressed by $I_0 \cos θ$.

Here, the ratio of luminous flux captured by the reflector 5 to the luminous flux emitted from the light emitter 21 is defined as aperture efficiency. In case the luminous flux is captured by means of the reflector 5 as much as possible, that is, the aperture efficiency is 100%, the following relation stands:

$$D = 4 \times f \quad (1)$$

Then, when the aperture of the reflector has a circular form, the reflector aperture area (hereinafter simply referred to as "reflector area") designated by s can be given by, $$s = \pi \times D \times D / 4 \quad (2)$$

At that time, where the area effective to arrange the light sources is S, the maximum number N of light sources can be given by, $$N \approx S/s \quad (3)$$

Practically, when the contour of reflector 5 is circular, the light sources are arranged with gaps therebetween to form the light source unit and therefore the value of N is incorrect. But, this does not matter in the relative comparison in a description to be given hereinafter and this value will be used for the sake of simplification.

Figure 3:
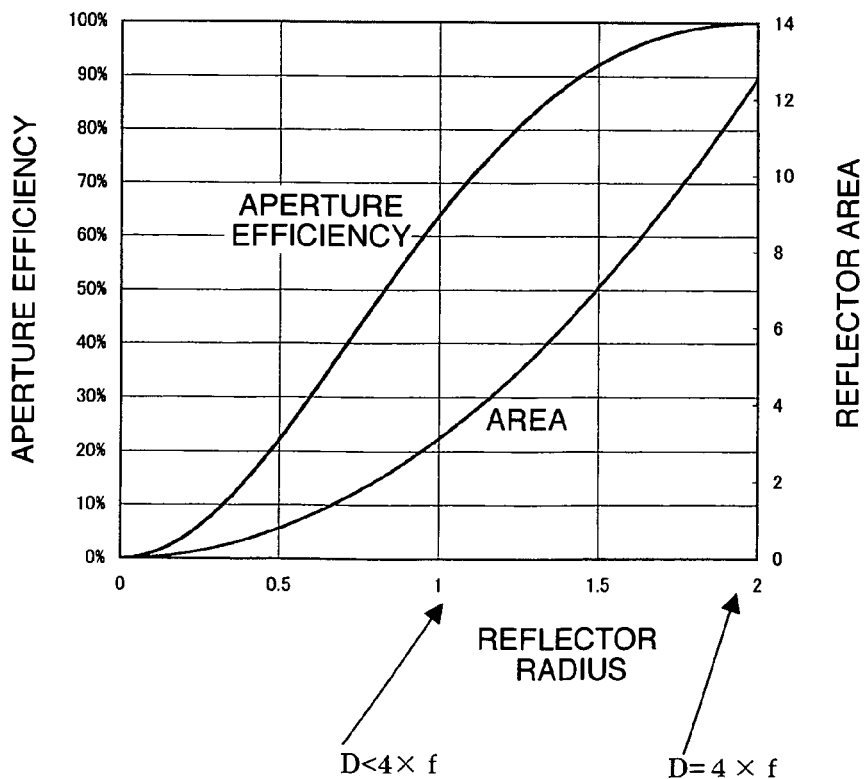
FIG. 3 is a graph showing how the aperture efficiency and reflector area are related to the reflector radius when a single LED is used.

Referring to FIG. 3, there is graphically illustrated how the aperture efficiency and reflector area are related to the reflector radius in a unit of light source as shown in FIG. 2 when f=1 is held. In the figure, left-side ordinate represents aperture efficiency for luminous flux, right-side ordinate represents reflector area and abscissa represents reflector radius. At D=4×f, 100% of aperture efficiency can be obtained and the reflector area has the maximum value. But, the reflector area is not always in proportional relationship to the aperture efficiency and from the standpoint of aperture efficiency per area, the smaller the reflector area, the higher the aperture efficiency value becomes as will be seen from FIG. 4.

Figure 4:
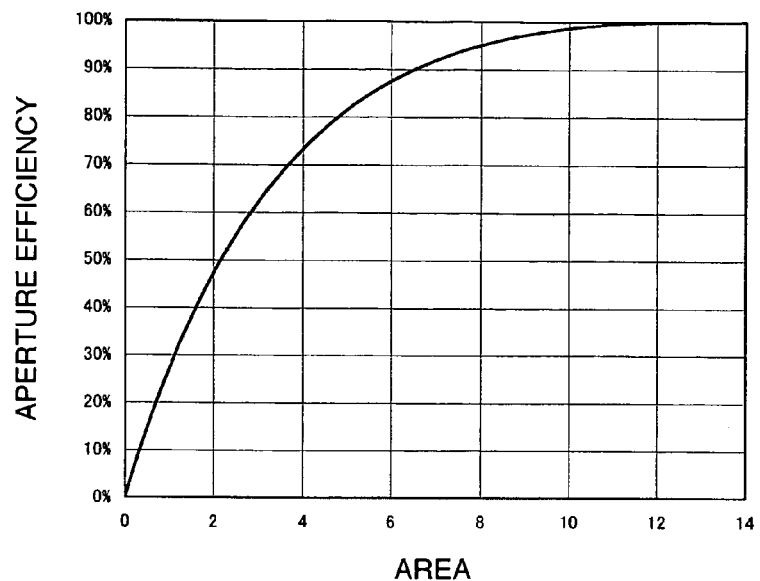
FIG. 4 is a graph showing the relation between reflector area and aperture efficiency in a light source unit.

From FIG. 3, the relation between reflector area and aperture efficiency is obtained as graphically depicted in FIG. 4, where abscissa represents reflector area and ordinate represents changes in aperture efficiency. It will be seen from FIG. 4 that the larger the reflector area, the smaller the gradient becomes, thus demonstrating that even when the reflector area is reduced starting from a state where the aperture efficiency is 100% or maximal, the aperture efficiency reduces at a relatively small rate. In other words, by making the reflector area smaller to increase the number of LED's correspondingly so as to arrange the LED's densely, a light source unit having a larger quantity of total luminous flux can be provided.

To confirm the above, how the total luminous flux quantity of a light source unit comprising a plurality of reflection type LED's changes will be explained hereunder.

The total luminous flux quantity of the light source unit will now be defined as follows:

Total luminous flux quantity=luminous flux quantity of light emitter of LED light source×aperture efficiency×number N of LED light sources (4)

The ratio of quantity of luminous flux emitted from the light source unit to quantities of luminous flux from the light emitters of all LED light sources (that is, the ratio of the total luminous quantity expressed by equation (4)) is defined as output efficiency. Further, in the following description, the total luminous flux quantity from the light emitters of LED light sources is handled as 1 for the convenience of description. In addition, the area S within which the reflection type LED light sources can be arranged is set to be the same as the area of a reflector having a reflector radius of 2 (as mentioned previously, f=1 is assumed) and then the total luminous flux quantity is determined by taking the number of reflection type LED light sources into account. In that case, the number N of reflection type LED light sources can be determined by the following equation by way of equation (3):

$$N=2\times 2\times \pi/s \qquad (5)$$

Figure 5:
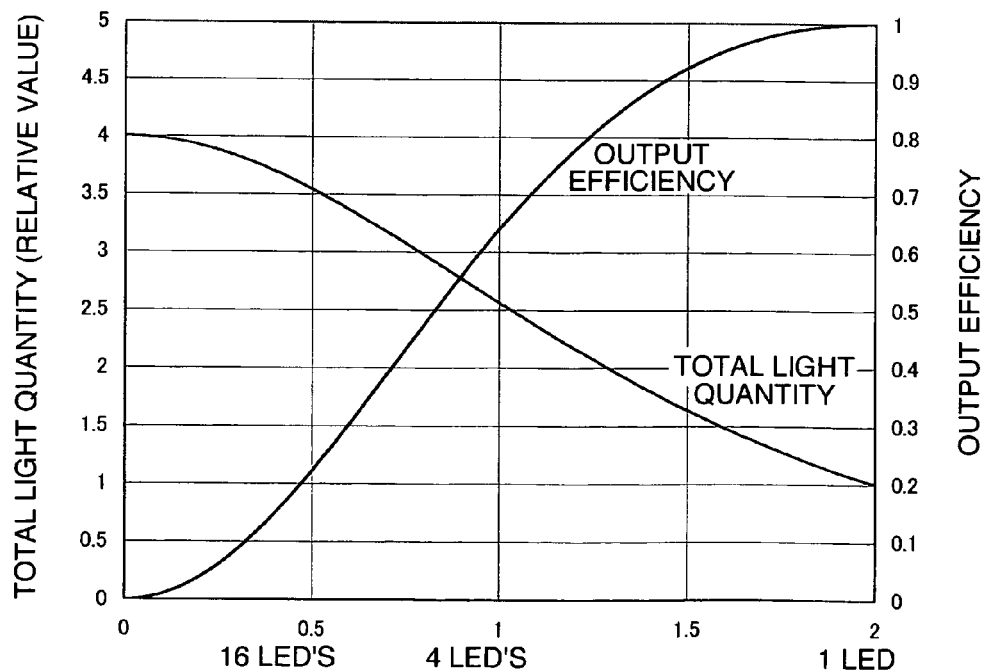
FIG. 5 is a graph showing how the output efficiency and the total measured quantity of light of the whole of the light source unit change in relation to the reflector radius.

Under the above condition, the total luminous flux quantity and output efficiency of the light source unit comprised of the plurality of reflection type LED's are calculated in relation to the reflector radius indicated on abscissa as shown in FIG. 5. In FIG. 5, beneath values of the reflector radius on abscissa, values of the number N of LED light sources determined pursuant to equation (5) and corresponding to the reflector radius values are indicated. For example, with the reflector radius being 1, the LED light source number N is 4 pursuant to equation (5).

It is confirmed by FIG. 5 that the smaller the reflector radius, the higher the output efficiency per reflector area becomes as described previously and as a result, the number of LED's can be increased correspondingly so as to increase the total luminous flux. Since the smaller the reflector radius, the more the total luminous flux increases, the maximum value of reflector radius is set not to 2 but to 1 in the present embodiment, thereby ensuring that the total luminous flux quantity which is about 2.5 times that in the case of 2 can be obtained. Namely, by setting $$D<4\times f \qquad (6),$$

the output luminous flux quantity of the light source unit can be increased.

Embodiment 2

A second embodiment of this invention will now be described. As will be clear from FIG. 5, with the reflector radius being further reduced from 1, for instance, further increased total luminous flux quantity can be expected but the output efficiency is reduced in the extreme and a burden of, for example, heat dissipation increases, failing to materialize the practical construction. Therefore, the reflector radius may preferably be set in the range within which the output effi-ciency does not fall below 50% (reflector radius of about 0.8). The upper limit of the reflector radius may be set to a value corresponding to the total luminous flux quantity indicative of the brightness of the light source unit, which value may preferably be 1.3 times (reflector radius of about 1.75) or more and more preferably 1.5 times (reflector radius of about 1.6) or more.

From the above viewpoint, the reflector radius in the range as shown in inequality (7) is used in the present embodiment.

$$1.6\times f<D<3.2\times f \qquad (7)$$

Incidentally, in the embodiments set forth so far, the shape of reflector has been explained as being the form of a paraboloid of revolution but in accordance with the size and shape of the light emitter 21, a reflector 5 shaped to an ellipsoid of revolution or a non-spherical form resulting from slight deformation of the form of a paraboloid of revolution may be conceivable. In that case, too, advantages similar to those explained previously can be offered but the shape cannot be prescribed in accordance with inequalities (6) and (7). Then, obviously, the focal distance of the form of an ellipsoid of revolution or of the form of a paraboloid of revolution which is substantially congruent with the non-spherical form may be applied or the reflector diameter may be prescribed as below by using distance Z between light emitter 21 and apex at the center of reflector which is set to be substantially equal to the focal distance:

$$D<4\times Z \qquad (6')$$

or $$1.6\times Z<D<3.2\times Z \qquad (7')$$

According to the foregoing embodiments, the value of luminous flux emitted from each of the LED light sources is not maximized but correspondingly, many LED light sources can be arrayed inside a limited area and the quantity of output light from the light source unit can be increased. In other words, high brightness can be attained while respecting the efficiency within the limited area, thus making it possible to provide a light source unit comprising an array of a plurality of light sources such as LED's having reflection mirrors and a projection type video display apparatus provided with the same.

Obviously, in the light source unit, independent reflection type LED's may be arranged or may be integrally arranged into an array form.

Further, for the "LED light source" constituting the light source unit, either a light emitting diode (LED) made of inorganic solid crystal (for example, compound semiconductor crystal such as GaP, GaAsP or GaAlAs) for emitting light under the application of forward voltage or an organic EL (electro-luminescence) device, so-called OLED (organic light emitting diode), having a luminescent layer of organic molecules sandwiched between two electrodes may be used. Namely, "LED light source" names generically them.

While in the foregoing embodiments the light source unit has been described as emitting white luminous flux, this invention is in no way limited thereto and obviously can be applied to the light source unit emitting light of a specified color as shown in FIG. 6 of the afore-mentioned JP-A-2003-329978.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A light source unit for use in a projection type video display apparatus having a video display device for modulating light on the basis of a video signal and a projection lens for projecting output light emitted from said video display device upon a screen, comprising:

at least two arrayed light sources; and a focusing mirror in the form of a reflector disposed in correspondence with each of said light sources and having a shape of paraboloid or non-spherical form approximating the paraboloid, wherein each light source in the arrayed light sources emits light semi-spherically towards an apex at a center of said focusing mirror; and wherein when D represents an effective diameter of said reflector, f represents a focal distance of said mirror and Z represents a distance between a light emitter of said light source and the apex at the center of said focusing mirror, said light source unit is so constructed as to satisfy $1.6 \times f < D < 3.2 \times f$ or $1.6 \times Z < D < 3.2 \times Z$.

2. A light source unit according to claim 1, wherein said light source is formed of an LED.

3. A projection type video display apparatus comprising:

a light source unit;

a video display device which modulates luminous flux from said light source unit on the basis of a video signal; and a projection lens which projects output light from said video display device upon a screen, wherein said light source unit includes at least two arrayed light sources and a focusing mirror in a form of a reflector disposed in correspondence with each of said light sources and having a shape of paraboloid or non-spherical form approximating the paraboloid, wherein each light source in the arrayed light sources emits light semi-spherically towards an apex at a center of said focusing mirror; and wherein when D represents an effective diameter of said reflector, f represents a focal distance of said mirror and Z represents a distance between a light emitter of said light source and the apex at the center of said focusing mirror, said light source unit is so constructed as to satisfy $1.6 \times f < D < 3.2 \times f$ or $1.6 \times Z < D < 3.2 \times Z$.

4. A projection type video display apparatus according to claim 3, wherein said light source is formed of an LED.

* * * * *